United States Patent
Turatti

[11] Patent Number: 5,277,107
[45] Date of Patent: Jan. 11, 1994

[54] TRIMMER FOR VEGETABLES INCLUDING BROCCOLI

[76] Inventor: Antonio Turatti, La Petite Marchanderie 68, rue de Tours, 49650 Allonnes, France

[21] Appl. No.: 781,317

[22] Filed: Oct. 25, 1991

[30] Foreign Application Priority Data

Oct. 26, 1990 [FR] France .................... 90 13317

[51] Int. Cl.⁵ ............... A23N 15/02; A23N 15/04; A47J 21/00
[52] U.S. Cl. ........................... 99/638; 99/635; 99/637; 99/642; 99/643
[58] Field of Search ............ 99/537, 538, 546, 584, 99/635-639, 641-643

[56] References Cited

U.S. PATENT DOCUMENTS

| | | | |
|---|---|---|---|
| 1,207,889 | 12/1916 | Fletcher | 99/635 |
| 1,717,827 | 6/1929 | Ayars | 99/642 |
| 2,936,013 | 5/1960 | Kirshner | 99/643 |
| 3,319,683 | 5/1967 | Belk | 99/642 |
| 3,380,500 | 4/1968 | Alpen | 99/637 |
| 3,399,703 | 9/1968 | Schwacofer | 99/635 |
| 3,646,977 | 3/1972 | Goodale | 99/635 |
| 3,690,049 | 9/1972 | Roberson | 99/643 |
| 3,695,323 | 10/1972 | Akesson et al. | 99/637 |
| 3,886,857 | 6/1975 | Goodale | 99/563 |
| 4,168,642 | 9/1979 | Evans | 99/637 |
| 4,658,714 | 4/1987 | McIlvain et al. | 99/637 |
| 4,773,324 | 9/1988 | Wylie et al. | 99/638 |
| 5,074,203 | 12/1991 | Hirtle et al. | 99/547 |

FOREIGN PATENT DOCUMENTS

| | | | |
|---|---|---|---|
| 813818 | 6/1937 | France . | |
| 2116868 | 7/1972 | France . | |
| 2376632 | 9/1978 | France | 99/642 |

Primary Examiner—Timothy F. Simone
Attorney, Agent, or Firm—Sandler Greenblum & Bernstein

[57] ABSTRACT

Trimmer for vegetables of the broccoli type is provided with a structure supporting a rotating plate in which are mounted vegetable holding systems. Each vegetable holding system is free to rotate about its axis so as to be capable of being propelled with a movement of rotation about that axis by a drive device. The device for driving in rotation acts during a portion of each revolution of the rotating plate during which a cutter associated with the corresponding vegetable holding system is brought by a control system against the vegetable so as to remove heads from the vegetable at the required section.

22 Claims, 4 Drawing Sheets

TRIMMER FOR VEGETABLES INCLUDING BROCCOLI

FIELD OF THE INVENTION

This invention relates to a trimmer for vegetables, and concerns in particular a trimmer for broccoli.

The trimmer according to the invention cuts and separates all of the small florets from the stalks or stems of broccoli. These florets are then directed automatically onto a belt which carries them onto the production line, the stalks or stems being discharged in another direction.

According to an essential characteristic of the invention, the removal of florets from the broccoli and the trimming of its stalks or stems is fully automated.

DISCUSSION OF BACKGROUND INFORMATION

The developing to the consumption of vegetables having a stem or stalk bearing a bunch of florets, sets the problem of the cutting of these florets which are intended for consumption. To this end, entirely manual processes are known which have the disadvantage of requiring high labor with an extremely high production cost.

Broccoli feed systems are also known in which the broccoli passes by translation in front of one or two cutters driven with a movement of rotation about their axes. Each of these cutters thus comes to cut the broccoli so as to separate the stem from the florets. It is observed that in rudimentary installations of this type, the cutting of the stem or stalk from the florets is always performed in the same manner. For this reason, this kind of machine has the disadvantage of giving florets which are not properly cut and have to be recut manually. Machines of this type are thus relatively unproductive and supply florets of poor quality.

SUMMARY OF THE INVENTION

The object of this invention is to propose a trimmer for vegetables of the broccoli type, which fully removes the heads from each broccoli plant by means of a single fully automatic machine, in the shortest possible time, while respecting the requirement to recover all of the florets, and removing only their stems or stalks.

The invention thus relates to a trimmer for vegetables of the broccoli type which is constituted by a structure supporting a rotating plate. Vegetable holding systems are mounted in this rotating plate, so that each of these vegetable holding systems is free to rotate about its axis so as to be capable of being propelled with a movement of rotation about that axis by a device for driving in rotation.

According to the invention, this device for driving in rotation acts during a portion of each revolution of the rotating plate, and simultaneously a cutter, which is associated with the corresponding vegetable holding system, is brought by a control system against the vegetable so as to remove its heads at the required section. More precisely the control system of each of the cutters comprises a cam device, in which the cam is borne by the structure of the machine.

Moreover, according to the invention, each vegetable holding system co-operates with an assembly for locking in position, which acts after the rotating plate has completed the portion of revolution during which the vegetable holding system is itself propelled with a movement of rotation about its axis. The assembly for locking in position then acts on the corresponding vegetable holding system so as to place it in loading position and to hold it in that position, i.e., the position in which the opening for insertion is directed radially towards the outside of the rotating plate. More precisely, each assembly for locking in position of a vegetable holding system is mounted directly on this vegetable holding system.

Thus, the trimmer according to the invention has the essential characteristic of causing the vegetable to turn upon itself, and of moving a cutter to the required position so as correctly to remove all of the floret heads from the vegetable.

According to one embodiment of the invention, the trimmer structure supports:

a vertical central post which is driven by a motor with a step-down gear, and which is attached to a substantially horizontal rotating plate which bears the vegetable holding systems having vertical axes, and the control systems of the cutters;

the cam of the cutters, which is arranged circularly so as to correspond to the radial position with respect to the rotating plate of the vegetable holding systems;

the device for driving in rotation of the vegetable holding systems.

More precisely, the central post is held by two bearings, a lower bearing and an upper bearing which are fixed to the structure. The rotating plate is constituted by a hub bearing arms which are connected to one another by a ring of substantially circular shape. Each arm is extended to the outside of this ring by an end which supports the corresponding vegetable holding system.

Advantageously, the device for driving in rotation of the vegetable holding systems comprises a drive belt which is set in motion by a driving pulley having a vertical axis. This driving pulley is connected to a motor with variable transmission unit. The drive belt comes to press tangentially against the outside of pulleys which are each attached to a corresponding vegetable holding system. This drive belt comes to press against one of these pulleys at the moment when this pulley, which is driven by the rotating plate, enters the zone of action of the drive belt. This zone of action corresponds to the portion of each revolution during which the corresponding vegetable holding system has to turn about its axis. More precisely, the driving pulley is set inside the drive belt, and it is held in place by two idler pulleys. These two idler pulleys are arranged symmetrically with respect to the longitudinal plane of the machine, i.e., the plane passing through the axis of the rotating plate and through the axis of the driving pulley. These two idler pulleys having vertical axes are mounted in the structure outside the range of circular movement of the vegetable holding systems, so that their distance from the driving pulley in the direction parallel with the longitudinal plane is determined so that the driving in rotation of the vegetable holding systems about their axes is performed during the required portion of revolution of the rotating plate.

Preferably, each vegetable holding system comprises a grip which is carried by the corresponding pulley by means of supporting columns. The pulley is attached to a shaft which is arranged at its upper part on the other side from the grip. This shaft is mounted in the rotating plate by means of a bracket, which is carried by the end of the corresponding arm, so that the shaft can rotate freely about its axis. Advantageously, each of these brackets comprises two bearings for holding of the pulley shaft.

According to the invention, the drive belt may comprise at least one trapezoidal belt. This trapezoidal belt is engaged in a trapezoidal groove of the driving pulley and in a trapezoidal groove of each of the two idler pulleys of the drive device, and also in a trapezoidal groove of each of the pulleys of the vegetable holding systems concerned.

Preferably, each of the grips of the vegetable holding systems comprises a system of two levers which are arranged symmetrically with respect to a plane passing through the axis of the pulley. Each of these levers is mounted in the body of the grip by means of a substantially vertical articulation pin, so as to have a large side having an end which bears a jaw for gripping the vegetable and a small side having an end which is constituted by a toe. This toe is engaged in the notch of a cam which is actuated by an operating system. By means of this operating system, the cam can be propelled with a movement of translation along its own axis, so as to act upon each of the toes of the levers through the corresponding face of the notch in question, so as to cause the small side of each of the levers to turn about its articulation pin, in order to move the two jaws of the two levers apart or together with respect to one another.

With the invention in this configuration, the operating system is constituted by a double-acting pneumatic jack which is fed by a pipe connected to a swivel joint. More precisely, the pneumatic jack feed system comprises an electrically controlled distributor which is actuated by a switch. This electrical switch is controlled by a cam which is mounted on the structure of the trimmer.

Advantageously, according to the invention, each cutter is mounted on the outside of the rotating plate, and the cutter control system comprises a jack which is attached to a cutter-holding chuck. This jack co-operates with the cam device, the cam of which is borne directly by the structure of the trimmer. More precisely, the jack comprises a body in which a shank slides which is attached to a control roller. This control roller is in permanent contact with the cam. The shank carries a piston which slides in the body, and which is pushed by a return spring mounted in this body and, pressing against the bottom of the body so as to press the control roller constantly against the cam.

Preferably, according to the invention, the jack is mounted on the outside of the ring of the rotating plate, by means of an intermediate plate. This intermediate plate is provided with two circular openings which co-operate with fixing means on the ring, so as to obtain an adjustment of the position of the jack with respect to the rotating plate.

According to a particular embodiment of the invention, each assembly for locking in position of the corresponding vegetable holding system comprises a peg, the axis of which is parallel with the shaft of the holding system pulley. This peg becomes engaged in a circular notch which is made in the upper face of the pulley. Moreover, the peg is borne by the rotating plate and actuated by a cam system, the cam of which is borne directly by the structure. More precisely, the peg is securely attached to a jack which is actuated by the cam system, and the jack is borne by the pulley shaft bracket.

More precisely, the jack comprises a body in which a shank slides which is attached to a control roller in permanent contact with the cam. The shank carries a piston which slides in the body and which is pushed by a return spring. The return spring is mounted inside the body and presses against the bottom of this body so as to press the control roller constantly against the cam.

Moreover, in order to improve the operation of the locking system according to the invention, the circular notch comprises a face for support of the peg, which is inclined with respect to the upper face of the pulley so as to have a slope for engagement.

According to the invention, the trimmer additionally comprises a horizontal cutter which is mounted on the structure at the exit from the zone of action of the drive belt.

The process for removing heads from vegetables of the broccoli type, according to the invention, includes:

placing the vegetable stem between the jaws of the levers of the grip of the vegetable holding system which is locked in rotation about its axis by the assembly for locking in loading position, that is to say with its opening for insertion directed radially towards the outside of the rotating plate, the jaws being in open position under the action of the operating system;

bringing the jaws together against the vegetable stem under the action of the operating system so as to hold the vegetable in the corresponding grip;

the vegetable and its holding system moving with the rotating plate as far as the start of the zone of driving in rotation, and in the locking assembly simultaneously leaving the vegetable holding system free to rotate about its axis, under the action of the cam;

the vegetable and its holding system entering the zone of driving in rotation, and the cam simultaneously controlling the movement of the corresponding cutter so as to remove heads from the vegetable throughout the movement of the holding system in this zone, the florets falling onto a conveyor belt;

moving the cutter clear and raising it again at the end of travel through the zone of driving in rotation, and controlling a horizontal cutter which comes to cut off the central floret or florets from the stem;

in the vegetable and its holding system leaving the zone of driving in rotation, and in the jaws opening under the action of the operating system, so as to allow the remaining stem to fall onto a conveyor belt;

the assembly for locking in position coming to lock the vegetable holding system in rotation about its axis, under the action of the cam, so as to place the vegetable holding system in loading position.

The trimmer for vegetables of the broccoli type according to the invention thus has the advantage of correctly separating the florets from the stem of each broccoli plant. Moreover, the machine according to the invention enables these operations to be performed entirely automatically with an extremely high productivity which is of the order of 2,400 to 2,800 units per hour. By this means an extremely low production cost can be achieved compared with other known means of production.

BRIEF DESCRIPTION OF THE DRAWINGS

Other advantages of the invention will emerge, and will be better understood with the help of the non-exhaustive description given below of particular embodiments of the invention, with reference to the attached drawings in which.

DESCRIPTION OF PREFERRED EMBODIMENTS

The trimmer for vegetables, more particularly broccoli plants, is constituted essentially by a structure 1 which supports a rotating plate 6 in which are mounted vegetable holding systems. Each of these vegetable holding systems is mounted in the rotating plate 6, so as to be free to rotate about its axis. The structure 1 also comprises a device for driving in rotation each of the vegetable holding systems about their axis. The device for driving in rotation acts on each of the vegetable holding systems intermittently, that is to say during a portion of each revolution of the rotating plate. During this portion of a revolution of the rotating plate 6, a cutter 23, which is associated with the corresponding vegetable holding system, is brought by a control system against the vegetable so as to remove its heads at the required section.

Figure 1:
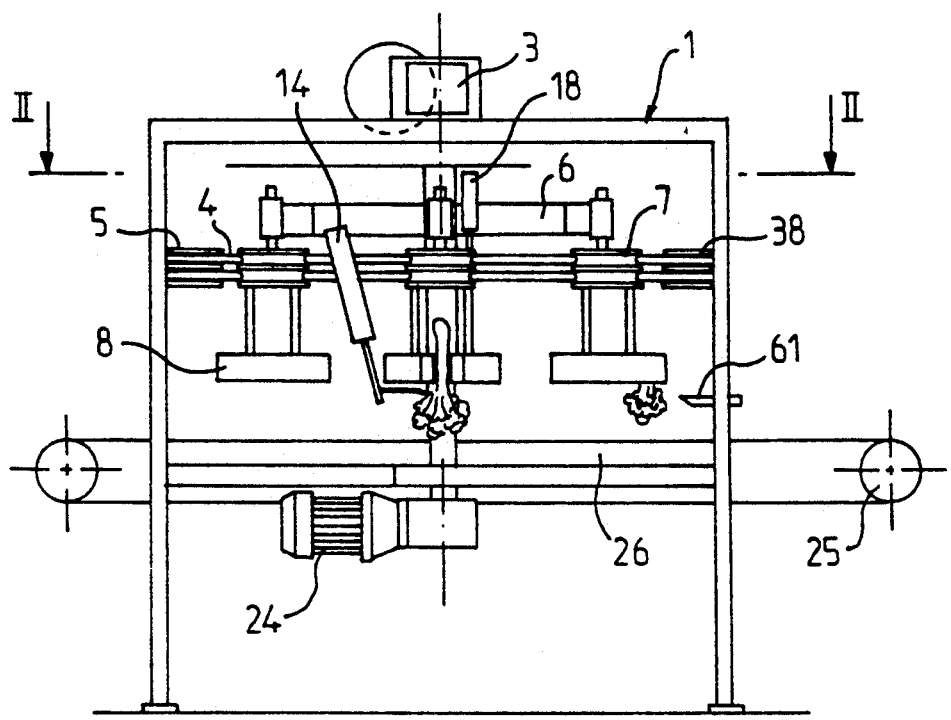
FIG. 1 is a diagrammatic general view in elevation of the vegetable trimmer according to the invention.
Figure 2:
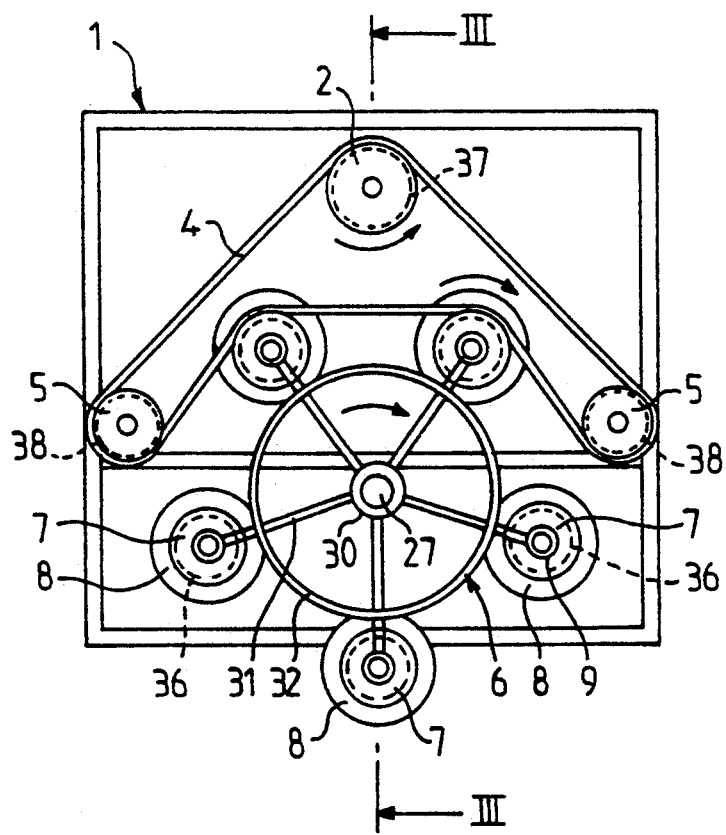
FIG. 2 is a diagrammatic plan view take along II—II of FIG. 1.
Figure 3:
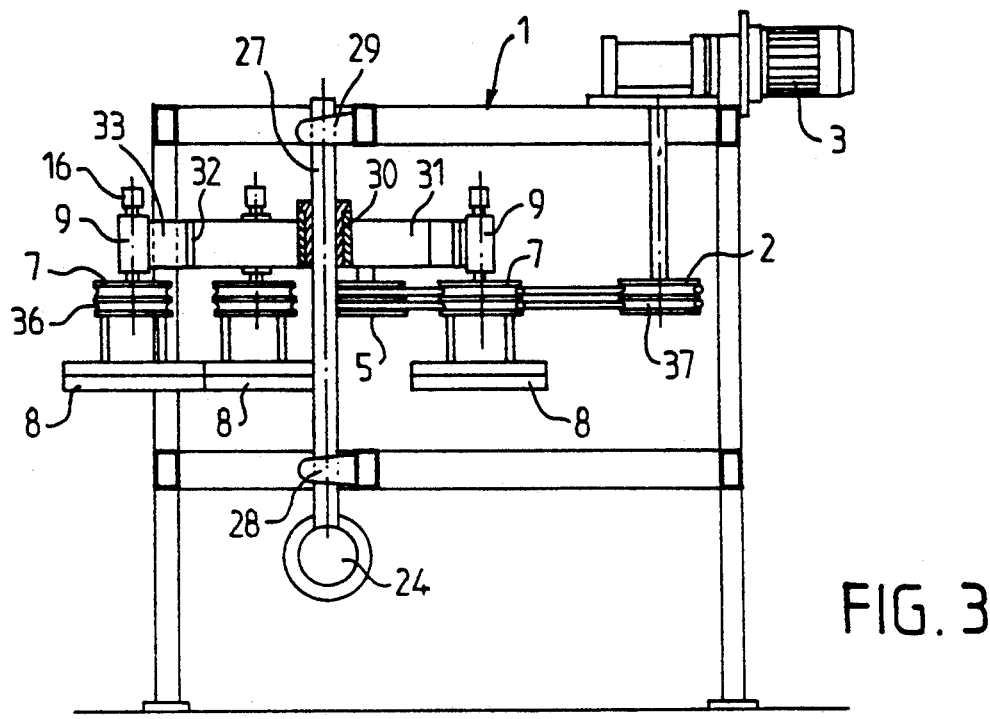
FIG. 3 is a diagrammatic view take along plane III—III of FIG. 2.

As can be seen diagrammatically in FIGS. 1, 2 and 3, the trimmer essentially comprises vegetable holding systems which are driven in rotation by the rotating plate 6, a device for driving in rotation of these holding systems, cutters 23 each with its control system, each of these cutters and control systems being associated with a corresponding vegetable holding system. Each cutter control system 23 comprises a cam device 13 (FIG. 4) which acts during a portion of a revolution during which the device for driving in rotation acts on the corresponding vegetable holding system. The cam 13 is borne directly by the structure 1 of the machine.

So that each vegetable can be mounted appropriately in its holding system, an assembly for locking in position is associated with each vegetable holding system. Thus, after the portion of a revolution of the rotating plate 6 during which the corresponding vegetable holding system is itself propelled with a movement of rotation about its axis, the assembly for locking in position acts on the vegetable holding system so as to place it in loading position and hold it in that position. As the machine is loaded from the outside, this loading position corresponds to placing its insertion opening radially towards the outside of the rotating plate 6.

The structure 1 is an assembly of pillars and beams which support a vertical central post 27 attached to the rotating plate 6 and the device for driving in rotation of the vegetable holding systems. The structure 1 also supports the cam 13 of the cam devices corresponding to each of the cutter control systems 23. The cam 13 is arranged circularly above the rotating plate 6, so as to correspond to the radial position of each of the vegetable holding systems with respect to the rotating plate 6.

The vertical central post 27 is driven by a motor with step-down gear 24, and it carries the rotating plate 6 which is substantially horizontal. The central post 27 is held by two bearings, a lower bearing 28 and an upper bearing 29, which are each fixed to the structure of the machine.

The rotating plate 6 is constituted by a hub 30 which carries arms 31. These arms 31 are connected to one another by a ring 32 of substantially circular shape. Each arm 31 is extended to the outside of this ring 32 by an end 33 which supports the corresponding vegetable holding system. The rotating plate 6 is connected to the central post 27 by its hub 30 which is attached to the central post 27. The control systems of each of the cutters 23 are mounted directly on the rotating plate 6, close to each of the corresponding vegetable holding systems.

The device for driving in rotation of the vegetable holding systems comprises a drive belt 4 which acts on each of the vegetable holding systems when the latter enters the zone of action of the drive belt 4, i.e., the zone which corresponds to the portion of each revolution during which the corresponding vegetable holding system has to turn about its own axis. The drive belt 4 is set in motion by a driving pulley 2, the axis of which is vertical, supported by the structure 1. This driving pulley 2 is driven by a motor with variable transmission unit 3. Each of the vegetable holding systems comprises a pulley 7 which is attached to the vegetable holding system and against which the drive belt 4 comes to press tangentially at the outside of the pulley 7. This drive belt 4 comes to press against the pulley 7 of a vegetable holding system at the moment when this pulley 7, which is driven by the rotating plate 6, enters the zone of action of the drive belt 4.

The driving pulley 2 is set inside the drive belt 4, which is held in place on the structure by two idler pulleys 5. Each of these two idler pulleys 5 is set on the structure 1 symmetrically with respect to the longitudinal plane of the machine. This longitudinal plane passes through the axis of the rotating plate 6, and through the axis of the driving pulley 2. Moreover, the two idler pulleys 5 having vertical axes are mounted in the structure 1 outside the range of circular movement of the vegetable holding systems. These idler pulleys 5 are situated so that their distance from the driving pulley 2 in the direction parallel with the longitudinal plane of the machine is determined so that the driving in rotation of the vegetable holding systems about their own axes is performed during the required portion of a revolution of the rotating plate.

The drive belt 4 is constituted by two trapezoidal belts which are engaged in two grooves of mated section which are provided on each of the pulleys 7 of the vegetable holding systems, on the driving pulley 2 and on the idler pulleys 5. Thus, as can be seen in FIGS. 2 and 3 in particular, the trapezoidal belts are engaged in grooves 37 provided on the driving pulley 2, in grooves 38 provided on the two idler pulleys 5, and in grooves 36 provided on each of the pulleys 7 of the vegetable holding systems.

The structure 1 also supports two conveyor belt devices marked 25 and 26, respectively. The conveyor belt 25 is adapted to recover the broccoli florets, whereas the conveyor belt 26, not shown in the figures, is adapted to receive the broccoli stems.

Each assembly for locking in position of the corresponding vegetable holding system is mounted on the rotating plate 6, and, according to the embodiment shown in the figures, it is mounted directly on the vegetable holding system. The assemblies for locking the vegetable holding systems in position are actuated by a cam system 17 which is mounted directly on the structure 1.

Each of the vegetable holding systems comprises a grip generally marked 8, which is attached to the corresponding pulley 7 and which is actuated by an operating system controlled by a cam 21. The cam 21 of the various systems for operating the grips 8 is mounted directly on the structure 1 of the machine.

The structure 1 thus comprises three cams: the cam 13 which acts on the control systems of the cutters, the cam 17 which acts on the assemblies for locking of the vegetable holding systems, and the cam 21 which acts on each of the operating systems for opening or closing of the vegetable grip 8. Thus, each of the vegetable holding systems has its cutter control system, its locking assembly, and its operating system for the grip 8, which are actuated by the different cams 13, 17 and 21, depending on the circular position of this vegetable holding system with respect to the axis of the central post 27.

Each vegetable holding system comprises its grip 8 which is carried by the corresponding pulley 7 by means of supporting columns 34. This pulley 7 is attached to a shaft 35 which is arranged at its upper part on the other side from the grip 8. The shaft 35 is mounted in the rotating plate 6 by means of a bracket 9. This bracket 9 is borne by the end 33 of the corresponding arm 31, so that the shaft 35 can turn freely about its axis. To this end, the bracket 9 comprises two bearings for holding of the shaft 35 which may, for example, be bearings of the ball-bearing type.

Figure 4:
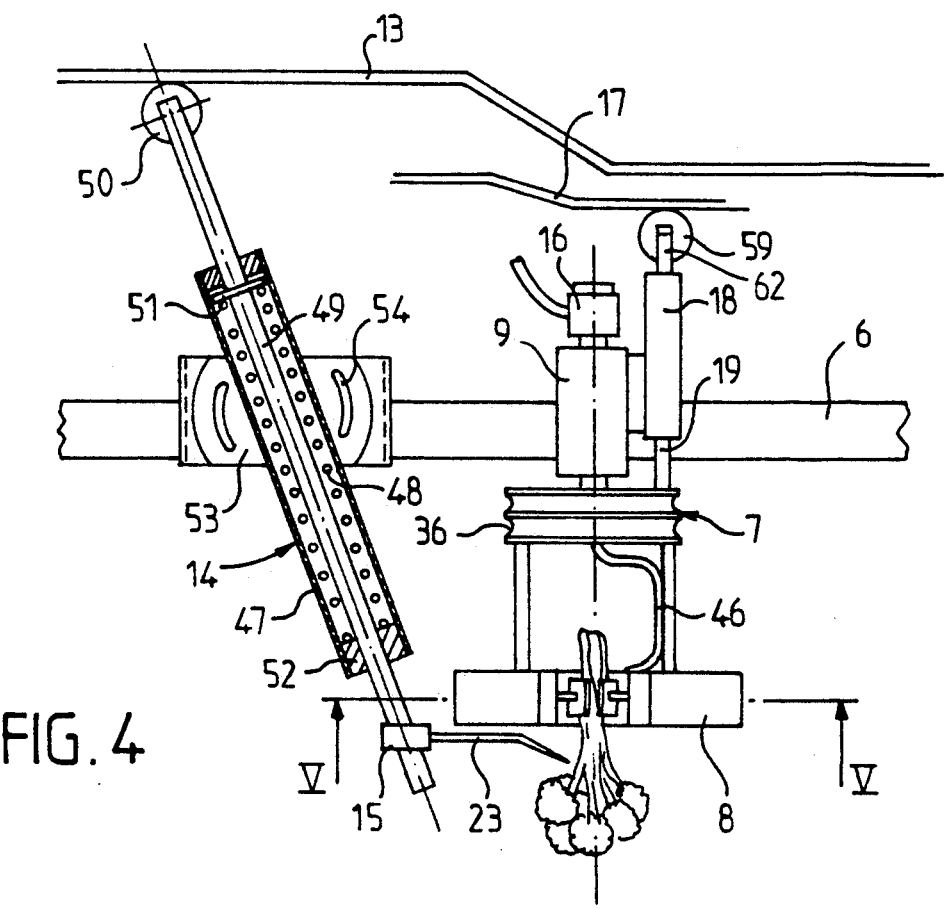
FIG. 4 is a detail view of the assembly of a vegetable holding system according to the invention, with its cutter control system.
Figure 5:
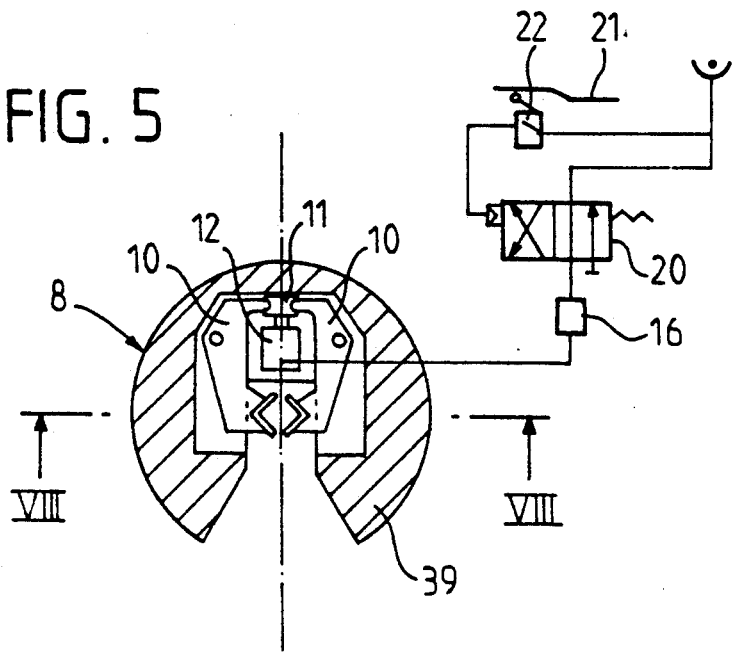
FIG. 5 is a partial section take along V—V of FIG. 4.
Figure 6:
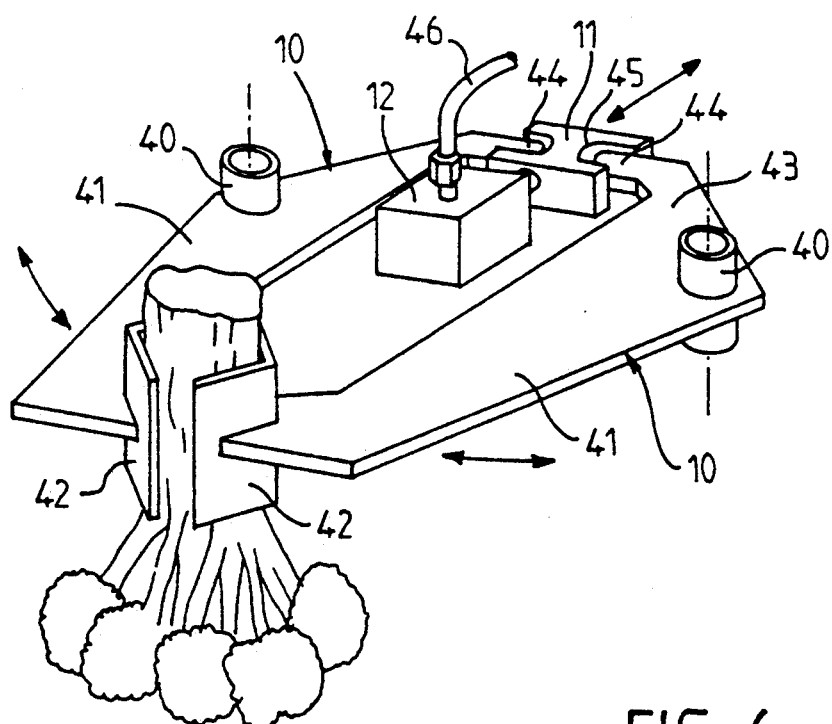
FIG. 6 is a perspective view of the grip system according to the invention.
Figure 7:
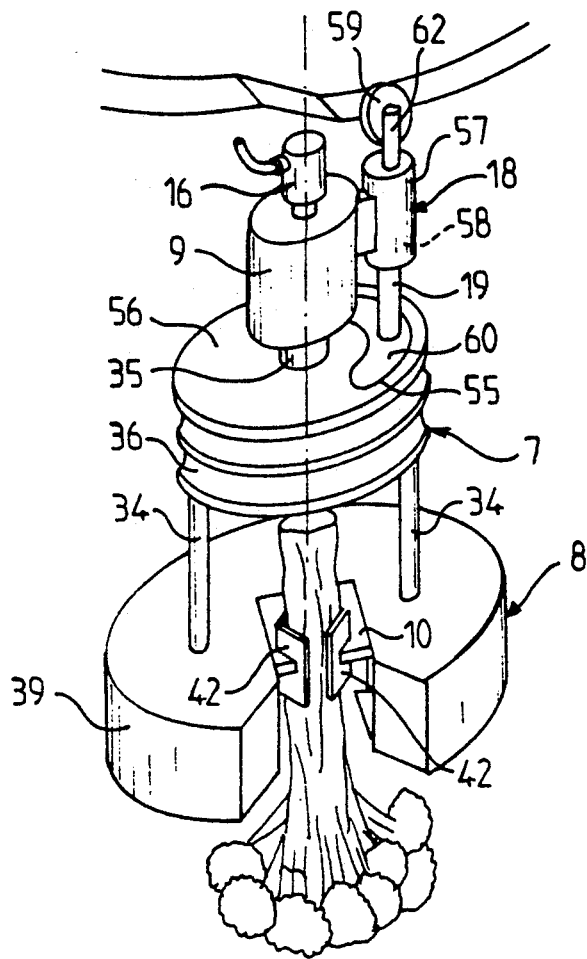
FIG. 7 is a general perspective view of a vegetable holding system corresponding to FIG. 4.
Figure 8:
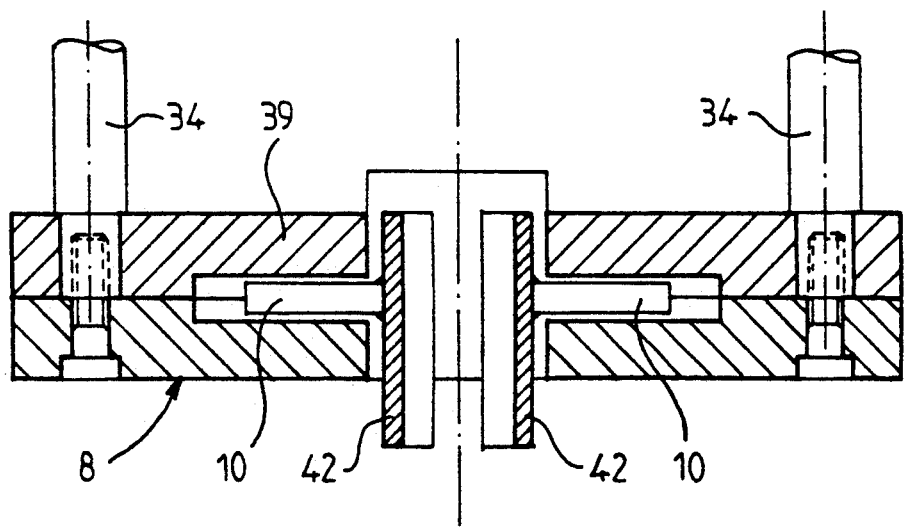
FIG. 8 is a cross-section take along VIII—VIII of FIG. 5.

The various details of each vegetable holding system are shown in FIGS. 4 and 7, whereas all of the details relating to the grip 8 and to its operating system are shown in FIGS. 5, 6 and 8. The grip 8 comprises a system of two levers 10 which are arranged symmetrically with respect to a plane passing through the axis of the pulley 7. Each lever 10 is mounted in the body 39 of the grip by means of an articulation pin 40, which is substantially vertical. Each of the levers 10 thus has a large side 41 and a small side 43. The large side 41 has its end which bears a jaw 42 for gripping the vegetable, and the small side 43 has an end which is constituted by a toe 44. This toe 44 engages in a notch 45 provided in a cam 11. The operating system actuates this cam 11 so that a translation of the cam 11 along its own axis acts upon the toe 44 of each of the levers 10 through the corresponding face of the notch 45. In this manner, the cam 11 causes the small side 43 of the lever 10 to turn about its articulation pin 40, so as to move the two jaws 42 of the two levers 10 apart or together with respect to one another.

The operating system of the cam 11 is constituted by a pneumatic jack 12 which is fed by a pipe 46 connected to a swivel joint 16, as can be seen in FIGS. 4 and 6. More precisely, as shown in FIG. 5, the feed system of the pneumatic jack 12 comprises an electrically controlled distributor 20 actuated by a switch 22. This switch 22 is itself controlled by the cam 21 which is mounted on the structure 1.

As was explained previously, each of the cutters 23 is mounted on the outside of the rotating plate 6, and more precisely on the ring 32. The control system of each of these cutters 23 comprises a jack 14 which is attached to a cutter-holding chuck 15. This jack 14 co-operates with the cam device 13 which is borne by the structure 1. The jack 14 comprises a body 47 in which slides a shank 49 which is attached to a control roller 50 in contact with the cam 13. This shank 49 bears a piston 51 which slides in the body 47, and which is pushed by a return spring 48. This return spring is also mounted in the body 47 around the shank 49, and it presses against the bottom 52 of this body 47 so as to press the control roller 50 against the cam 13.

In order to provide adjustment capabilities when mounting the jack 14 on the outside of the ring 32 of the rotating plate 6, this jack 14 is mounted by means of an intermediate plate 53. This intermediate plate 53 is itself provided with two openings 54 which co-operate with fixing means on the ring 32. This additional device thus makes it possible to adjust the position of the jack 14 with respect to the rotating plate 6, and finally with respect to the corresponding vegetable holding system.

As can be seen in detail in FIGS. 4 and 7, each assembly for locking in position of the corresponding vegetable holding system comprises a peg 19 which becomes engaged in a circular notch 55 belonging to the pulley 7. The peg 19 has its axis which is parallel with the shaft 35 of the pulley 7, and it is borne by the rotating plate 6. This peg 19 is actuated by the cam system 17 which is borne by the structure 1. The circular notch 55 is provided on the upper face 56 of the pulley 7, and it comprises a face 60 for support of the peg 19. This support face 60 is inclined with respect to the upper face 56 of the pulley 7, so as to have a slope for engagement.

The peg 19 is attached to a jack 18 which is actuated by the cam system 17 which is borne by the structure 1. This jack 18 is itself borne by the bracket 9 of the shaft 35 of the pulley 7. The jack 18 comprises a body 57 in which slides a shank 62, which is attached to a control roller 59 in contact with the cam 17. This shank 62 bears a piston which slides in the body 57 and which is pushed by a return spring 58. This return spring 58 is itself mounted in the body 57, and presses against the bottom of the body 57, so as constantly to press the control roller 59 against the cam 17.

Moreover, according to the invention, a horizontal cutter 61 is mounted on the structure 1 at the exit from the zone of action of the drive ring, as can be seen in FIG. 1. This horizontal cutter 61 is adapted to move to cut off the central floret or florets remaining on the stems at the end of travel through the zone of driving in rotation.

The process for removing heads from broccoli-type vegetables, which uses the machine according to the invention described above consists:

in placing the vegetable stem between the jaws 42 of the levers 10 of the grip 8 of the vegetable holding system locked in rotation about its axis by the assembly for locking in loading position, that is to say with its opening for insertion directed radially towards the outside of the rotating plate 6, the jaws 42 being in open position under the action of the operating system;

in bringing the jaws 42 together against the vegetable stem under the action of the operating system so as to hold the vegetable in the grip 8;

in the vegetable and its holding system moving with the rotating plate 6 as far as the start of the zone of driving in rotation, and the locking assembly simultaneously leaving the vegetable holding system free to rotate about its axis, under the action of the cam 17;

in the vegetable and its holding system entering the zone of driving in rotation, and in the cam 13 simultaneously controlling the movement of the corresponding cutter 23 so as to remove heads from the vegetable throughout the movement of the holding system in this zone, the florets falling onto the conveyor belt 25;

in moving the cutter 23 clear and raising it again at the end of travel through the zone of driving in rotation, and in controlling a horizontal cutter 61 which comes to cut off the central floret or florets from the stem;

in the vegetable and its holding system leaving the zone of driving in rotation, and in the jaws 42 opening under the action of the operating system, so as to allow the remaining stem to fall onto a conveyor belt 26;

in the assembly for locking in position coming to lock the vegetable holding system in rotation about its axis, under the action of the cam 17, so as to place the vegetable holding system in loading position.

I claim:

1. Trimmer for vegetables including broccoli, comprising:

a rotating plate having an axis of rotation;

structure for supporting said rotating plate;

a plurality of vegetable holding systems mounted on said rotating plate, each of said plurality of vegetable holding systems being mounted entirely on said rotating plate and having an axis of rotation which is substantially parallel to the axis rotation of said rotating plate;

drive means for driving such of said plurality of vegetable holding systems in rotation during a portion of rotation of said plate;

a plurality of cutters carried by said rotating plate, each of said plurality of cutters being fixed in rotation with respect to and being associated with a corresponding one of said plurality of vegetable holding systems;

a control system for bring each of said plurality of cutters against a vegetable in a corresponding one of said plurality of vegetable holding systems so as to cut a vegetable during rotation of a vegetable holding system during a portion of rotation of said plate.

2. The trimmer according to claim 1, wherein said control system comprises a first cam, said first cam being carried by said structure.

3. The trimmer according to claim 1, wherein each vegetable holding system cooperates with an assembly for locking in position, so that after said portion of rotation of said rotating plate during which the vegetable holding system is rotated, said vegetable holding system is placed in and is maintained in a loading position with a opening for insertion of a vegetable being radially directed towards an outside area of said rotating plate.

4. The trimmer as claimed in claim 3, wherein each assembly for locking of a corresponding vegetable holding system in position is mounted directly on said corresponding vegetable holding system.

5. The trimmer as claimed in claim 2, wherein said structure supports:

a vertical central post which is driven by a motor with step-down gear, and which is attached to said rotating plate which is substantially horizontal and supports said control system, said plurality of vegetable holding system having vertical axes;

a second cam for said plurality of cutters arranged circularly so as to correspond to a radial position with respect to said rotating plate; and said drive means for driving each of said plurality of vegetable holding systems.

6. The trimmer as claimed in claim 5, comprising a lower bearing and an upper bearing fixed to said structure for supporting said vertical central post; and wherein said rotating plate comprises a hub bearing arms connected to each other by a ring of substantially circular shape, each of said arms being extended outside of said ring by an end supporting one of said plurality of vegetable holding systems.

7. The trimmer as claimed in claim 6, wherein said drive means for driving each of said plurality of vegetable holding systems comprises a drive belt which is set in motion by a driving pulley having a vertical axis and connected to a motor with step-down gear, and a plurality of pulleys, with each puller being attached to a corresponding vegetable holding system and including an outside for contact with said drive belt; said drive belt tangentially pressing against the outside of a corresponding pulley when the pulley against the outside of a corresponding pulley when the pulley, which is driven by the rotating plate, is in an active zone of said drive belt, which corresponds to said portion of each revolution of said rotating plate in which a corresponding vegetable holding system rotates.

8. The trimmer as claimed in claim 7, wherein said driving pulley is positioned inside said drive belt, which is held in place by two idler pulleys which are symmetrically arranged with respect to a longitudinal plane passing through said axis of rotation of said rotating plate and through an axis of rotation of said driving pulley, said two idler pulleys having vertical axes mounted in said structure outside a range of circular movement of said plurality of vegetable holding systems, so that their distance from said driving pulley, in a direction parallel with said longitudinal plane, is determined so that rotation of a corresponding vegetable holding system is performed during a predetermined portion of revolution of said rotating plate.

9. The trimmer as claimed in claim 8, wherein each of said plurality of pulleys has an upper part and a lower part, and each of said plurality of vegetable holding systems comprises a grip carried by each of said plurality of pulleys by supporting columns on said lower part, each pulley being securely attached to a shaft arranged at said upper part, and a bracket carried by an end of a corresponding arm supports said shaft so that said shaft can freely rotate.

10. The trimmer as carried in claim 9, wherein said bracket comprises two bearings for holding said shaft.

11. The trimmer as claimed in claim 8, wherein each of said driving pulley, said plurality of pulleys and said two idler pulleys comprising at least one trapezoidal groove, and said drive belt comprises at least one trapezoidal belt engaging said at least one trapezoidal groove.

12. The trimmer as claimed in clam 9, wherein said grip comprises two levers symmetrically arranged with respect to a plane passing through the axis of a corresponding pulley, each of said two levers being mounted on a substantially vertical articulation pin so as to have a large side and a small side, a jaw for gripping a vegetable being associated with each large side, a toe being associated with each small side, a second cam having a notch engageable with each toe of said two levers, and an operating system for actuating said second cam so that translation of said third cam along a longitudinal axis acts on each toe through a corresponding face of said notch, so as to cause said small side of each lever to rotate on the articulation pin in order to move each jaw of said two levers apart or together with respect to one another.

13. The trimmer as claimed in claim 12, wherein said operating system comprises a double-acting pneumatic jack fed by a pipe connected to a swivel joint.

14. The trimmer as claimed in claim 13, wherein said pneumatic jack includes a feed system comprising an electrically controlled distributor actuated by a switch controlled by a third cam mounted on said structure.

15. Trimmer as claimed in claim 8, wherein each of said plurality of cutters is mounted outside said ring of said rotating plate, and wherein said control system comprises a jack securely attached to a cutter-holding chuck, said jack cooperating with said first cam.

16. The trimmer as claimed in claim 15, wherein said jack comprises a body, a shank sliding in said body, a control roller attached to said shank in contact with said first cam, a piston carried by said shank sliding in said body and pushed by a return spring mounted in said body, pressing against a bottom portion of said body so as to press said control roller against said first cam.

17. The trimmer as claimed in claim 15, wherein said jack is mounted outside of said ring of said rotating plate by an intermediate plate including two circular openings cooperating with fixing means on said ring, so as to enable adjustment of position of said jack with respect to said rotating plate.

18. The trimmer as claimed in claim 4, wherein each assembly for locking of a corresponding vegetable holding system in position comprises a peg having an axis which is parallel to an axis of rotation of said plurality of vegetable holding systems, and which engages in a circular notch made in an upper face of a pulley associated with each of said plurality of vegetable holding systems, said peg being actuated by a fourth cam supported by said structure.

19. The trimmer as claimed in claim 18, wherein said peg is attached to a jack actuated by said fourth cam, said jack being supported by a bracket supporting of a shaft of said pulley.

20. The trimmer as claimed in claim 19, wherein said jack comprises a body, a shank sliding in said body, a control roller attached to said shank in contact with said fourth cam, a piston supported by said shank sliding in said body and pressed by a return spring mounted in said body which presses against a bottom portion of said body so as to press said control roller against said fourth cam.

21. The trimmer as claimed in claim 18, wherein said circular notch comprises a face for support of said peg, said face being inclined with respect to said upper face of said pulley so as to have a slope for engagement.

22. The trimmer as claimed in claim 8, wherein a horizontal cutter is mounted on said structure at an exit from said active zone of said drive belt.

* * * * *